D. W. COLBURN.
Wheel-Cultivator.
No. 63,473. Patented Apr. 2, 1867.
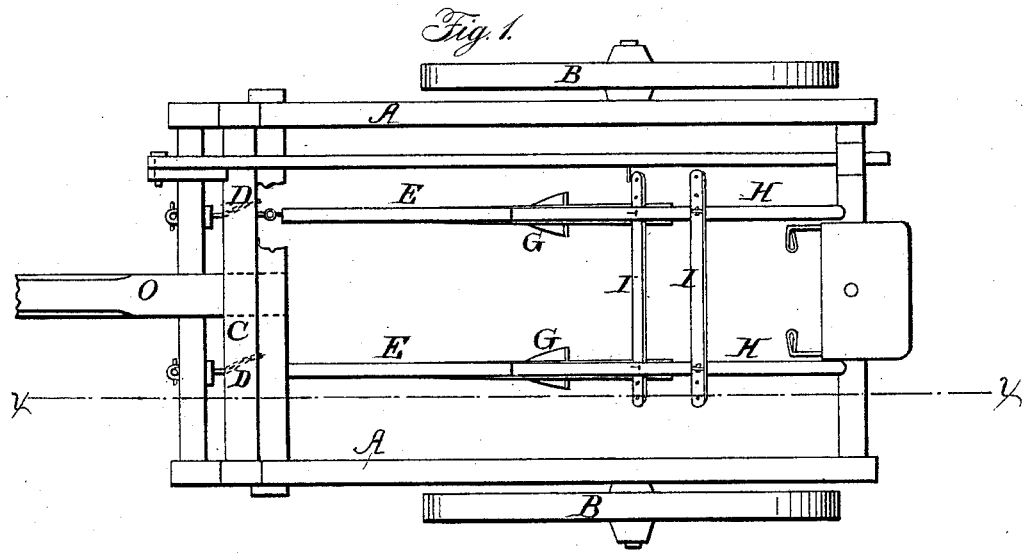
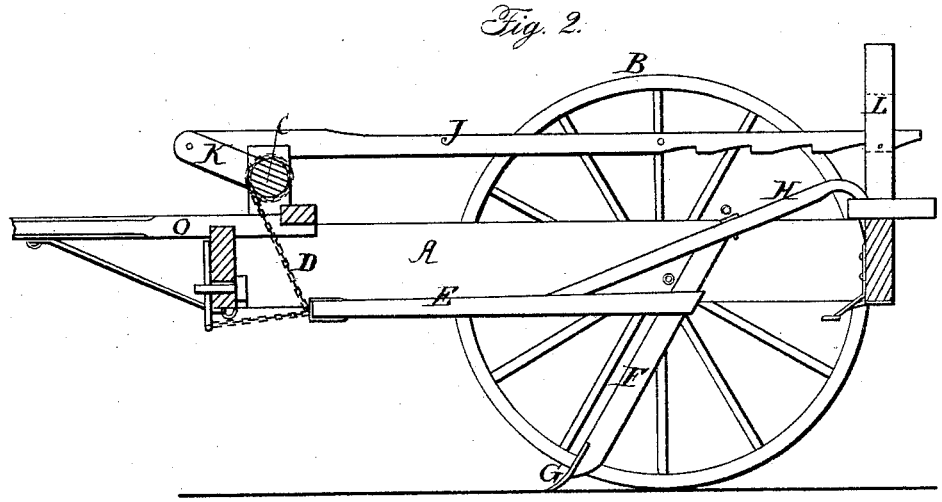
Witnesses:
F. A. Jackson
J. A. Service
Inventor:
D. W. Colburn
Per Munn & Co.
Attorneys

United States Patent Office.

DANIEL W. COLBURN, OF LOAMI, ILLINOIS.

Letters Patent No. 63,473, dated April 2, 1867.

---

IMPROVEMENT IN SULKY-PLOUGHS.

---

*The Schedule referred to in these Letters Patent and making part of the same.*

---

TO ALL WHOM IT MAY CONCERN:

Be it known that I, DANIEL W. COLBURN, of Loami, in the county of Sangamon, and State of Illinois, have invented a new and improved Sulky-Plough; and I do hereby declare that the following is a full, clear, and exact description thereof, reference being had to the accompanying drawings, forming part of this specification.

The nature of my invention consists in constructing a carriage or vehicle in such a manner that any of the ordinary ploughs in common use may be attached, and the labor of ploughing performed while the driver can ride and make the work easy.

To enable others skilled in the art to make and use my invention, I will proceed to describe its construction and operation.

Figure 1 is a top plan view of my improved sulky-plough.

Figure 2 is a longitudinal vertical sectional elevation from the line $x\ x$.

Letters of like name and kind refer to like parts in each of the figures.

A represents a rectangular frame made of wood, and of any suitable dimensions, and mounted on wheels B B that run on bearings or journals that are secured to the frame A. At the front end of the said frame A is a roller, C, that has bearings in the frame A. To the front cross-beam of the frame A are attached jack chains D D, that extend back and pass around the roller C. Between the roller C and the front cross-beam of the frame A are attached the two plough beams E E. To these plough beams are secured pendent standards F F, to which are secured the ploughs G G. H H are handles, which are connected to the standards F F and beams E E. These handles and standards are connected by two pivoted bars I I that pass from one to the other of the handles, and secured by a single bolt at each end so that the ploughs are allowed to work freely, both laterally and vertically, by which they may be made to conform to all the irregularities of the rows of corn, or may be guided as may be desired. J is a long bar that connects by a joint to the arm K, that is secured to the roller C. On the under side of this bar J are notches that work in the standard L that is secured to the rear cross-bar of the frame A. This said bar J is for the purpose of elevating and lowering the ends of the plough beams E E. By drawing this bar J back it winds the chains D D around the roller C, and raises the ends of the beams as may be desired. When one plough only is desired to be used, both chains are brought to the end of the beam and secured thereto by any well-known means, when the plough will draw from the centre of the frame. O is the pole or tongue by which the machine is drawn, and is attached to the frame by any well-known means. By my invention any kind of plough may be used, thus avoiding the expense of buying the several implements of cultivators, gang-ploughs, &c.

The advantages of my invention will be at once observed from the fact that the depths of the ploughs are not governed by the wheels, so that when they come to a hollow the ploughs are not drawn out of the ground by the wheels, as is the case when the ploughs are attached to the frame. It is well known that there is no plough or cultivator upon which the driver rides that does its work as well as walking and holding and guiding the plough, on account of the difficulty of keeping the ploughs to the proper depth, and guiding them to cut a straight and even furrow, or guide them to run close to hills of corn when the rows are not straight. These, as well as other objections, are obviated by my invention, by which the driver may ride and guide the plough as the nature of the work may require.

Having thus described my invention, what I claim as new, and desire to secure by Letters Patent, is—

The combination and arrangement of the beams E, chains D, roller C, arm K, notched bar J, and standard L, substantially as described for the purpose specified.

DANIEL W. COLBURN.

Witnesses:
 A. C. HAMMOND,
 JESSE T. UNDERWOOD.